UNITED STATES PATENT OFFICE.

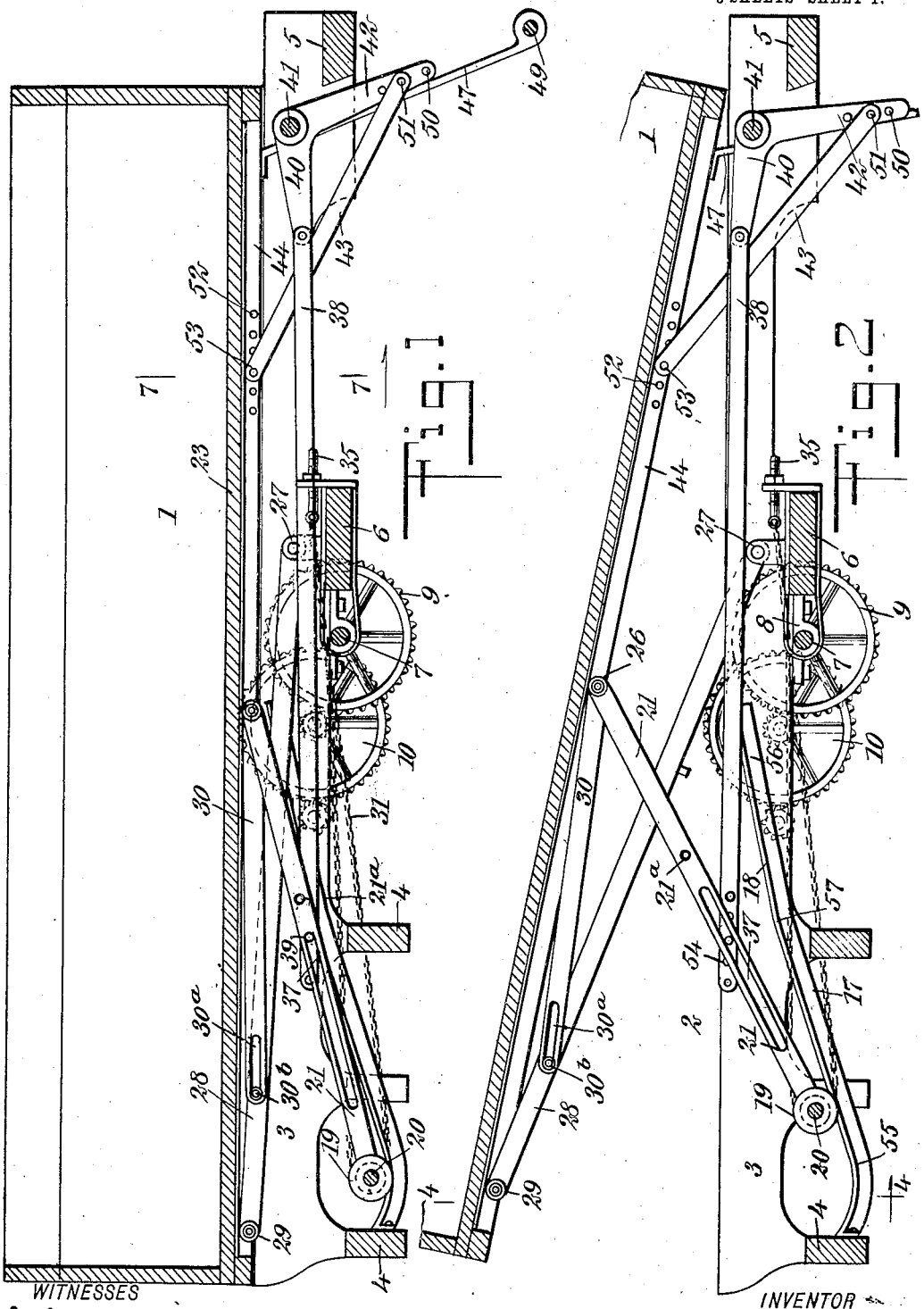

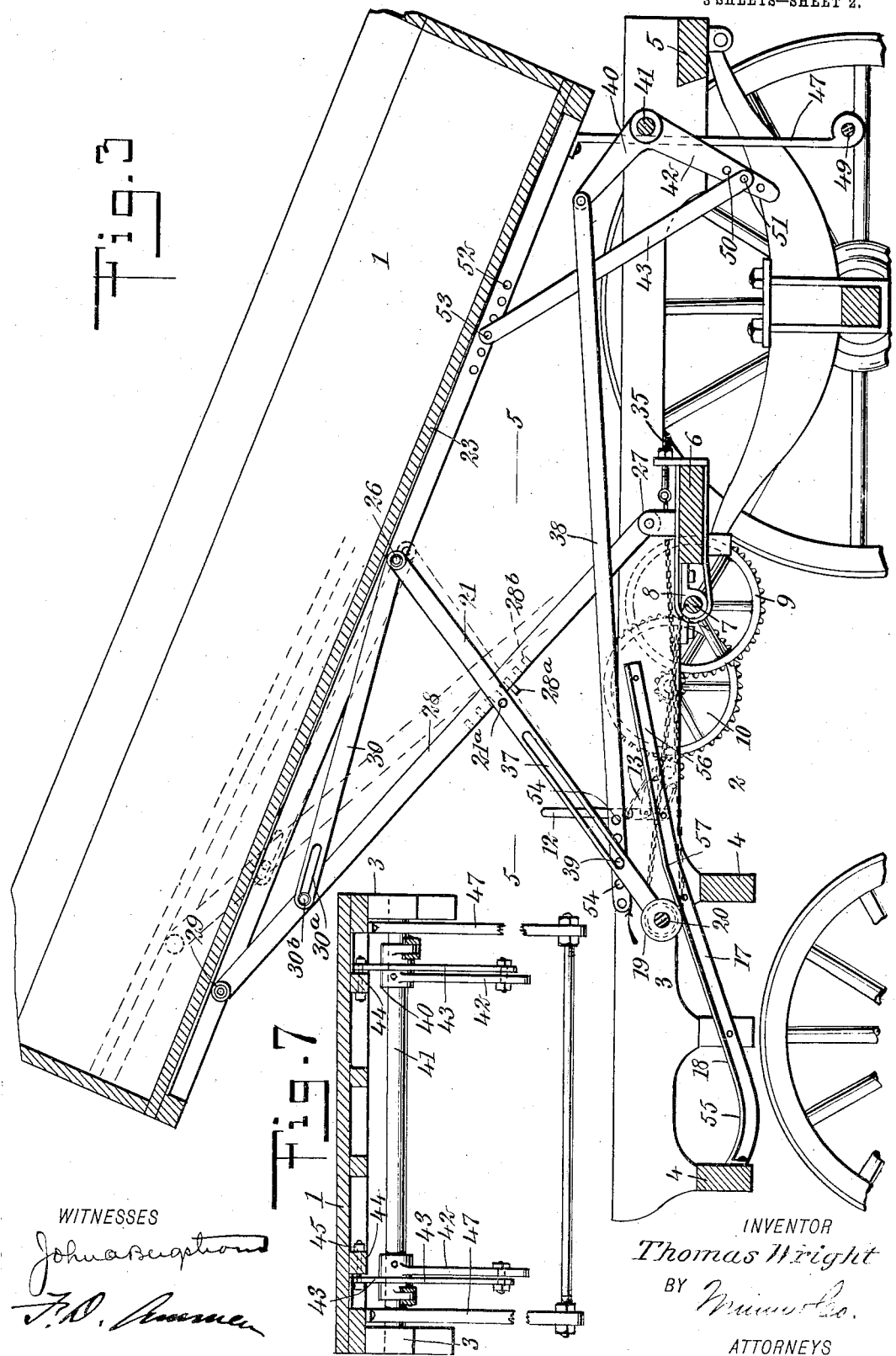

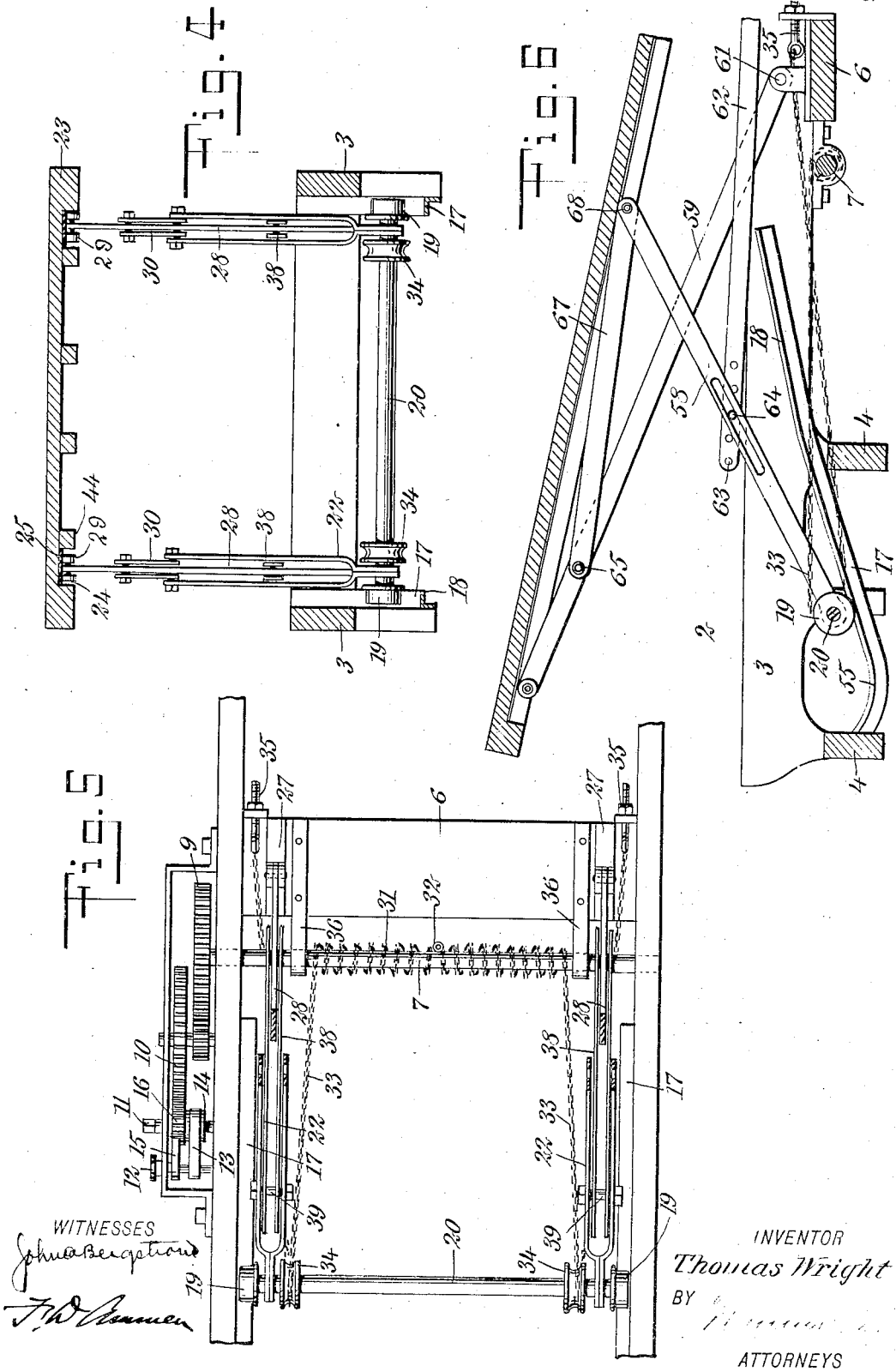

THOMAS WRIGHT, OF JERSEY CITY, NEW JERSEY.

DUMPING-WAGON.

No. 920,512.          Specification of Letters Patent.          Patented May 4, 1909.

Application filed June 20, 1908. Serial No. 439,491.

*To all whom it may concern:*

Be it known that I, THOMAS WRIGHT, a citizen of the United States, and a resident of Jersey City, in the county of Hudson and State of New Jersey, have invented a new and Improved Dumping-Wagon, of which the following is a full, clear, and exact description.

This invention relates to dumping wagons and carts such as used by coal dealers for delivering coal.

The invention concerns itself especially with that type of wagon or cart in which the body is raised above the truck in order to dump the contents. In many constructions which are used for this purpose, in elevating the body as suggested, the position of the body may change sufficiently so as to move the center of gravity of the load from a position of equilibrium. In this way the wagon or cart may be upset.

The object of this invention is to produce a simple construction in which the body of the wagon or cart may be raised and inclined, but in which the center of gravity of the body and its load will remain in substantially the same plane as when the body is in its normal position on the truck.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a longitudinal section through the upper portion of the truck and body of a wagon or cart constructed according to my invention, and showing the body in its normal depressed position; Fig. 2 is a view similar to Fig. 1, but showing the body partly raised, the upper portion of the body being broken away; Fig. 3 is also a longitudinal vertical section showing the body in a more elevated position, and in a second stage of the raising operation; Fig. 4 is a cross section taken near the front of the cart or body on the line 4—4 of Fig. 2; Fig. 5 is a plan of the middle portion of the truck and illustrating the elevating mechanism, certain parts being broken away and shown in cross section, this view may be considered as a section on the line 5—5 of Fig. 3; Fig. 6 is a longitudinal section showing a modified form of construction; and Fig. 7 is a vertical section on the line 7—7 of Fig. 1 and showing the construction of the wagon at the rear.

Referring more particularly to the parts, and especially to Figs. 1 to 3, 1 represents the body of the wagon or cart, which is supported upon a truck 2, said truck being composed of side bars 3 connected by cross bars or forward bolsters 4 and a rear bolster 5. Near its middle the truck construction comprises a transverse beam 6, and just forward of this beam, I provide a main shaft 7, as illustrated in Fig. 5, said shaft being supported in suitable bearings 8 attached to the under side of the side bars or stringers 3. This shaft 7 is provided at one end with a rigid gear wheel 9 which is driven through back-gearing 10 from a square-headed spindle 11, to which a removable crank may be applied when desired. At a suitable point near this back gearing, a brake lever 12 is provided, to which there is attached a brake band or strap 13 which passes around a brake drum 14 formed on the spindle 11, as indicated in Fig. 5. In addition to this, a pawl 15 is provided which engages one of the gears 16 of the back gearing, so as to prevent the backward rotation of the gearing which will be produced by the descent of the body 1. This pawl is pivoted on the lever 12 so that when the lever 12 is moved toward the left to apply the friction brake, the pawl will be disconnected; in this way the body may be allowed to descend gradually to its normal position.

As indicated most clearly in Fig. 3, on the inner faces of the side stringers 3, I provide guide rails 17 which are formed of angle iron, the flanges 18 of which project inwardly so as to form a track for rollers 19, which are carried upon a transverse roller shaft 20. Near the ends of this shaft 20, main legs 21 are attached. As shown in Fig. 5, these legs are bifurcated, that is, they are formed of oppositely disposed flat bars 22, the ends of which come together at the point of connection with the shaft 20. As indicated in Fig. 4, the bottom 23 of the wagon body is formed near its side edges with channels 24, and in the bottoms of these channels, wear strips 25, of steel or similar material, are placed. The upper ends of these main legs 21 are provided with rollers 26 which roll in these channels as will be readily understood. On the upper side of the beam 6, brackets 27 are provided, which form pivotal supports for a pair of forward legs 28. These legs 28 extend forwardly under the body, cross the main legs, and their upper ends are provided with rollers 29 which also roll along the channels 24. Links 30 connect these forward legs with the upper extremities of the main legs 21 by means of slots 30ª which receive pins 30ᵇ on the legs. On the shaft 7, a chain 31 is coiled, there being a loop formed at the middle of the chain about a bolt 32. The chain on one side of this bolt is coiled in a right-hand direction, while on the other side it is coiled in a left-hand direction. From points near the ends of the shaft 7, the chain extends forwardly in runs 33 which form loops around the chain wheels or pulleys 34 attached to the shaft 20. From these pulleys 34, the chain extends rearwardly and is attached to anchor bolts 35 mounted on the rearward side of the beam, as indicated in Fig. 3. In order to prevent the coils of the chain from working too far toward the ends of the shaft 7, I provide guards 36 in the form of strips of metal attached to the beam 6. These strips form loops around the forward side of the shaft 7 so as to prevent the chain working out as described.

The middle parts of the main legs 21 are provided with longitudinal slots 37, and between the bars 22 which form these legs 21, links 38 are received. These links are provided with transverse bolts 39 which run in the slots, as shown. These links 38 extend rearwardly and their rear extremities are attached to bell crank levers 40, which are loosely mounted near the ends of a transverse lever shaft 41, the ends of which shaft are mounted in the rear ends of the side stringers 3. The lower arms 42 of these bell crank levers are connected by links 43 with the sides of guide strips 44 by means of removable bolts 53. These guide strips form the inner sides of the channels 24. At the rear end of the body 1, downwardly projecting guard arms 47 are provided, which incline forwardly when the body is in its horizontal position, as shown in Fig. 1. These guards project down just before the shaft 41, as shown, and are disposed between the bell crank levers 40 and the side stringers of the frame or truck. The lower end of the guard arms 47 are connected by a horizontal bar or brace 49. The lower arms 42 of the bell crank levers are provided with a plurality of openings 50 which enable the rear legs 43 to be attached in different adjusted positions by means of a removable bolt 51. Similarly, the strips 44 are provided with a plurality of openings 52, in any one of which the upper ends of the rear legs 43 may be attached by removable bolts 53. In a similar manner the forward ends of the links 38 are provided with a plurality of openings 54 which enable the pins 39 to be placed in any desired adjusted position. On the main legs 21 near their middle points, transverse catch pins 21ª are provided and in the lower edges of the forward legs 28 removable studs 28ª are placed; as the body is being elevated these studs are adapted to strike the pins 21ª with an effect which will appear in the description of the mode of operation hereinbelow. In order to make the studs adjustable on the legs 28, I provide a plurality of openings 28ᵇ in any one of which the stud may be secured.

Referring to Fig. 3, attention is called to the form of the guide rails 17. The forward ends of the guide rails are depressed so as to form curved rests or seats 55 which receive the rollers 19 when the body is in its depressed position. From these seats the rails incline upwardly in a rearward direction, the rear ends of the rails being formed with straight extensions 56, which are less inclined than the body of the rails, as shown, and meet the body of the rails at the points 57.

The mode of operation of the wagon in raising the body, will now be described: By means of the removable crank, the shaft 7 is rotated by the back gearing 10 so as to shorten the loops of the chain which pass around the pulleys 34. This will rotate the shaft 20 in the direction of the arrow shown in Fig. 3, so that the rollers 19 will roll rearwardly on the rails 17. In this way the main legs will thrust upwardly against the under side of the body and will exert a tension in the links 30 which will raise the forward legs 28. In this way the body will tip upwardly at its forward end, but the rear end will remain substantially stationary. This movement is virtually a rotation about the shaft 41 as an axis. When the main legs 21 have advanced sufficiently, the pins 21ª will strike the edges of the forward legs 28. The main legs will then elevate the forward legs by a direct thrust against them, and after a slight upward rotation the studs 28ª will strike the pins and arrest any further sliding movement. The legs 21 will then move as though they were pivoted to the legs 28 and a scissor movement then follows; that is, as the rollers 19 advance on the guide rails the upper ends of the legs 21 and 28 will approach each other and the angle between the legs will decrease. The slots 30ª permit of this scissor movement; the pins 30ᵇ slide in the slots and the parts assume the relation shown in dotted lines in Fig. 3. It will be seen that in this way the body is given a great inclination. During this movement the ends of the slots 37 will strike the pins 39. When this point is reached, a thrust is exerted in the links or bars 38, and this thrust rotates the bell crank levers 40 in a right-hand direction. This rotation will produce a thrust in the rear legs 43 which will commence to raise the rear end of the body. Evidently, by adjustment, that is, by changing the position of the pins 39 in the openings 54, the moment at which the legs 21 will begin to move the bell crank levers may be made earlier or later. From this arrangement it will be noted that the body is brought into an elevated position without moving any substantial amount toward the rear; in this way the center of gravity of the load is maintained forward of the rear axle, hence there is no tendency of the load to overturn the truck. The extensions 56 of the rails 17 are less inclined, so as to reduce the speed of lifting at the front of the body to correspond with the speed of raising the rear end. After the body is brought to the inclined position shown in Fig. 3, and sufficiently raised, the tail-board of the body is removed so as to allow the contents of the body to be dumped.

Instead of employing the slots 30ª in the links 30, as shown in Figs. 1 to 3, I may adopt the modified construction shown in Fig. 6. In this form the main legs 58 are bifurcated as before, so as to receive the forward legs 59, which are pivoted at 61. The slots 30ª are omitted and the links 67 are simply pivoted to the legs 59, as shown. The bars or links 62 which extend rearwardly to attach to the bell crank levers, are provided with a plurality of openings 63 which enable them to be attached to the main legs 58 in different positions by means of removable bolts 64. The links 67 are pivoted at 68 to the main legs 58. In this form the pins 21ª and the studs 28ª are omitted so that no scissor-like movement takes place; the relative movement between the legs 58 and 59 is unrestricted and the main legs simply pull the forward legs up into position through the links 67. This construction does not give as great a dumping angle as in the preferred form. Attention is called to the fact that this mode of operation of the preferred form can be had at any time desired by simply removing the pins 21ª or the studs 28ª.

It will be understood that the slots 37 in connection with the pins 39, constitute a lost motion device for enabling the elevation of the forward end of the body to progress considerably before the elevation of the rear end begins. The guards 47 lie substantially against the forward side of the shaft 41 and thus hold the body against shifting unduly toward the rear of the wagon.

It will be observed that the links 30 have a very useful function at the beginning of the elevating movement, for they hold back the upper ends of the main legs and guide them upwardly so that they come quickly to a highly-inclined position. In this way, they assist in bringing the wagon body rapidly to its dumping angle.

Having thus described my invention, I claim as new and desire to secure by Letters Patent:

1. In a dumping cart or wagon, in combination, a truck, a body mounted thereupon, a transverse shaft on said truck at the rear thereof, rearwardly inclined guard arms rigidly attached to said body and extending downwardly therefrom, said guard arms being disposed near said shaft, means for elevating the forward end of the said body to bring said guard arms into a substantially vertical position, and means for elevating the rear end of said body.

2. In a dumping cart or wagon, in combination, a truck, a body, main legs supported on said truck, forward legs crossing said main legs and pivotally mounted on said truck, the upper ends of said legs being arranged to run freely on the under side of said body, means for advancing said main legs at their lower ends and giving the same a sliding movement across said forward legs, means for limiting the sliding movement of said main legs on said forward legs at their crossing point whereby a substantially pivotal connection is formed therebetween, and means for elevating the rear end of said body actuated from said main legs.

3. In a dumping cart or wagon, in combination, a body, a truck, main legs supported thereupon at their lower ends and sliding under the said body at their upper ends, means for advancing said main legs, forward legs pivotally mounted on said truck and adapted to slide across said main legs and sliding at their upper ends on the under side of said body, means for limiting the movement of said main legs with respect to said forward legs and producing a scissor movement therebetween, links connecting the upper ends of said main legs with said forward legs and having slots permitting said scissor movement, elevating mechanism at the rear of said body, and means for actuating the same from said main legs.

4. In a dumping cart or wagon, in combination, a truck, a body, guide rails mounted on said truck, main legs having rollers running on said guide rails and adapted to support said body at their free ends, means for advancing said main legs, forward legs pivotally mounted on said truck supporting said body at their free ends and crossing said main legs, links connecting the upper ends of said main legs with said forward legs, mechanism for raising the rear end of said body, and a lost motion device connecting said main legs with said last mechanism and adapted to elevate the rear end of said body after the forward end thereof has been elevated.

5. In a dumping cart or wagon, in combination, a truck, a body, guide rails on said truck, main legs having rollers running on said guide rails and supporting said body at their free ends, forward legs pivotally mounted on said truck supporting said body at their free ends and crossing said main legs, links connecting the upper ends of said main legs with said forward legs, said main legs having longitudinal slots therein near the lower part thereof, mechanism for raising the rear end of said body, and bars connected with said mechanism for actuating the same and having pins running in said slots, said slots affording means for permitting the elevation of the forward end of said body before the elevation of the rear end thereof.

6. In a dumping cart or wagon, in combination, a body, a truck having guide rails, main legs having rollers running on said guide rails, forward legs pivotally mounted on said truck and crossing said main legs, adjustable means for limiting the movement of said main legs on said forward legs and producing a scissor movement thereabout, and slotted links connecting the upper ends of said main legs with said forward legs.

7. In a dumping cart or wagon, in combination, a truck, a body mounted thereupon, a transverse shaft at the rear of said truck, rearwardly inclined guard arms rigidly attached to said body and near said shaft, bell crank levers mounted on said shaft and connected with the rear of said body to elevate the same, mechanism disposed forwardly on said body for elevating the forward end thereof, and means for connecting said last mechanism with said bell crank levers, operating after the forward end of said body has become elevated.

8. In a dumping cart or wagon, in combination, a truck, a body supported thereupon and having downwardly inclined rigid guard arms at the rear end thereof, a member mounted on said truck and coöperating with said guard arms to guide said body, bell crank levers rotatably mounted on said member, links connecting said bell crank levers to the under side of said body at the rear for elevating the same, mechanism for raising the forward part of said body, and a lost motion device connecting said last mechanism with said bell crank levers.

9. In a dumping cart or wagon, in combination, a truck, a body mounted thereupon, guide rails mounted on said truck, main legs having rollers running on said guide rails, mechanism connected with said main legs for elevating and supporting said body in an inclined position, mechanism for elevating the rear end of said body, and a bar connecting said last mechanism with said main legs and having a lost motion connection with said main legs, whereby said rear elevating mechanism operates after the body has been inclined by said main legs.

10. In a dumping cart or wagon, in combination, a truck, a body supported thereupon, guide rails on said truck, main legs having rollers running on said rails, forward legs pivotally mounted on said truck, links connecting said main legs with said forward legs, said legs being adapted to support said body on the upper ends thereof, means for advancing said rollers along said guide rails, mechanism for elevating the rear end of said body, and bars connecting with said last mechanism and having a pin and slot connection with said main legs.

11. In a dumping cart or wagon, in combination, a truck, a body mounted thereupon, guide rails mounted on said truck, forward legs pivotally mounted on said truck and engaging the under side of said body at their free ends, links connected with said forward legs, main legs connected with said links and thrusting at their upper ends against the under side of said body, rollers supporting said main legs and running on said rails, means for advancing said rollers along said guide rails, means for guiding the rear end of said body in a substantially vertical direction after it has been inclined by said legs, elevating mechanism at the rear end of said body, and a lost motion connection between said last mechanism and said main legs, permitting the elevation of the forward end of said body before the elevation of the rear end thereof.

12. In a dumping cart or wagon, in combination, a truck, a body thereabove, guide rails attached to said truck, main legs having rollers at their lower ends running on said guide rails, forward legs pivotally mounted on said truck, and links connecting said main legs with said forward legs near the upper parts thereof, said main legs and said forward legs being arranged to run freely on the bottom of said truck and being disposed toward the forward end of said truck.

13. In a dumping cart or wagon, in combination, a truck, a body thereabove, guide rails mounted on said truck, main legs having rollers on said guide rails, forward legs pivotally mounted on said truck, links connecting said main legs with said forward legs, the upper ends of said legs being arranged to slide freely on the bottom of said body, means for advancing said main legs so that said rollers move along said guide rails and said main legs slide across said forward legs, means for limiting the sliding movement of said main legs across said forward legs to produce a pivotal action therebetween, and means for guiding the rear end of said body.

14. In a dumping cart or wagon, in combination, a truck, a body mounted thereabove, guide rails on said truck, main legs running on said guide rails, forward legs pivotally mounted on said truck, links connecting said main legs with said forward legs near the forward ends thereof, all of said legs being arranged to run freely on the under side of said body, means for limiting the movement of said main legs on said forward legs to produce a scissor action therebetween, mechanism at the rear of said body for elevating the same, and means for connnecting said mechanism with said main legs for actuating said mechanism.

In testimony whereof I have signed my name to this specification in the presence of two subscribing witnesses.

THOMAS WRIGHT.

Witnesses:
F. D. AMMEN,
JOHN P. DAVIS.